United States Patent Office 3,261,849
Patented July 19, 1966

3,261,849
ALKYL GAMMA-HYDROXYL-1,4-QUINONES
Arthur F. Wagner, Princeton, Bruce O. Linn, Plainfield, and Aino Lusi, Rahway, N.J., assignors to Merck & Co., Inc., Rahway, N.J., a corporation of New Jersey
No Drawing. Filed Mar. 19, 1963, Ser. No. 266,202
3 Claims. (Cl. 260—396)

This invention relates to γ-hydroxy side chain derivatives of quinones and methods for preparing these compounds. More particularly, it is concerned with γ-hydroxy side chain derivatives of 2-methyl-1,4-quinones and process for preparing these derivatives from 2-methyl-3-(3-methyl-3-alkyl-2-propen-1-yl) substituted 1,4-quinones or the corresponding 6-chromanols.

The new compounds of the present invention can be shown structurally as follows

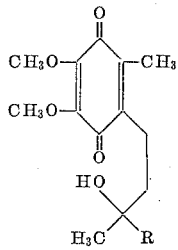

R is a member from the group consisting of methyl and

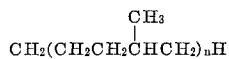

wherein $n$ is an integer from one to nine.

In accordance with one embodiment of this invention, it is now found that 6-chromanols of the coenzyme Q group are converted to the corresponding γ-hydroxy compounds by reaction with ferric chloride. Thus, a 6-chromanol of the formula

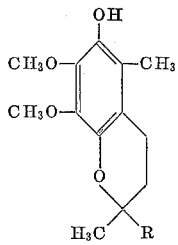

wherein R is a member from the group consisting of methyl and

where $n$ is a integer from one to nine, is intimately contacted with ferric chloride in a suitable medium for sufficient time to complete the conversion to the desired γ-hydroxy-1,4-quinone. The reaction can be effected by dissolving the chromanol in ether, adding thereto a solution of ferric chloride in aqueous ethanol, and intimately mixing the two-phase system. After completion of the reaction the γ-hydroxy derivative can be recovered by adding petroleum ether and water to the reaction mixture, separating the organic phase and evaporating the solvent.

Pursuant to a further embodiment of this invention, it is found that the γ-hydroxy side chain derivative of vitamin $K_{1(20)}$ is obtained when vitamin $K_{1(20)}$ is reacted with sulfuric acid. Thus, the γ-hydroxy compound is obtained by intimately contacting the vitamin $K_{1(20)}$ with sulfuric acid to obtain a homogeneous mixture, allowing the reaction mixture to stand for sufficient time to complete the reaction, diluting with ice-cold water, and recovering the desired γ-hydroxy derivative from the reaction mixture. The product can be recovered from the reaction mixture by extraction with a suitable solvent such as ether.

The following examples illustrate the processes of preparing the γ-hydroxy derivatives of the present invention.

EXAMPLE 1

3-(3-hydroxy-3,7,11,15-tetramethylhexadecyl)-2-methyl-1,4-naphthoquinone

An ice cold mixture of 2.2 g. of vitamin $K_{1(20)}$, (2-methyl-3-phytyl-1,4-naphthoquinone), in 20 ml. of concentrated sulfuric acid is stirred until it becomes homogenous. The solution is kept ice cold for about an hour and then poured onto ice. The product is extracted with ether, and the extract washed with water, dried over anhydrous magnesium sulfate and concentrated in vacuo. The residual oil (2.2 g.) is purified by chromatography on a column of 230 g. of silica gel packed in n-hexane. After preliminary elution using n-hexane and n-hexane containing 1%, 3% and 10% ether, the product is eluted with n-hexane containing 25% ether. The eluate is concentrated and the residue is purified by chromatography on 200 g. of silica gel. From the n-hexane eluate, 3-(3-hydroxy - 3,7,11,15 - tetramethylhexadecyl) - 2 - methyl-1,4-naphthoquinone is obtained. The product is characterized by $\lambda_{max.}^{isooctane}$ 325 mμ (E percent 58), 273 mμ (E percent 375), 264 mμ (E percent 366), 249 mμ (E percent 398), 244 mμ (E percent 380); $\lambda_{max.}^{neat}$ 2.9μ, 6.0μ

EXAMPLE 2

2,3-dimethoxy-6-(3-hydroxy-3-methylbutyl)-5-methyl-1,4-benzoquinone

Two hundred and fifty milligrams of the 6-chromanol of coenzyme $Q_1$ (7,8-dimethoxy-2,2,5-trimethyl-6-chromanol) is dissolved in 30 ml. of ether, and a mixture of 10 ml. of 5% ferric chloride in ethanol and 10 ml. of water is added slowly with rapid stirring. The reaction mixture is diluted with water and the layers are separated. The ether solution is washed with water until neutral, annd then dried over magnesium sulfate. Evaporation of the ether yields 2,3-dimethoxy-6-(3-hydroxy-3-methylbutyl)-5-methyl-1,4-benzoquinone. It is characterized by $\lambda_{max.}^{isooctane}$ 276 mμ ($E_{1\,cm.}^{1\%}$ 588)

EXAMPLE 3

2,3-dimethoxy-6-(3-hydroxy-3,7,11,15-tetramethylhexadecyl)-5-methyl-1,4-benzoquinone To a solution containing 5 g. of the 6-chromanol of hexahydrocoenzyme $Q_4$ [7,8-dimethoxy-2,5-dimethyl-2-(4,8,12-trimethyltridecyl)-6-chromanol] in 185 ml. of ether is added 185 ml. of 1.0 M ferric chloride in methanol-water (1:1). The two phase system is stirred at room temperature, 25° C., for 30 min., and then 300 ml. each of petroleum ether and water are added. The ether layer is washed with water, diluted with benzene, and separated from residual water. Evaporation under reduced pressure gives 2,3-dimethoxy-6-(3-hydroxy-3,7,11,15-tetramethylhexadecyl)-5-methyl-1,4-benzoquinone, $\lambda_{max.}^{isooctane}$ 276 mμ ($E_{1\,cm.}^{1\%}$ 322)

An analytical sample is prepared by column chromatography. One gram of the product is adsorbed from an isooctane solution onto 100 g. of Florisil packed in isooctane. The column is washed with ethanol-isooctane (1:99), and then the product is eluted with ethanol-isooctane (3:97) giving 2,3-dimethoxy-6-(3-hydroxy-3,7,11,15-tetramethylhexadecyl)-5-methyl-1,4-benzoquinone, $\lambda_{max}^{isooctane}$ 276 m$\mu$ ($E_{1\ cm.}^{1\%}$ 325); $\lambda_{max.}^{neat}$ 2.80$\mu$, 6.06$\mu$, 6.21$\mu$, 7.90$\mu$, 8.30$\mu$ and 8.63$\mu$ The nuclear magnetic resonance spectrum is consistent with the structure.

EXAMPLE 4

*2,3-dimethoxy-6-(3-hydroxy-3,7,11,15,19,23,27,31,35,39-decamethyltetracontanyl)-5-methyl-1,4-benzoquinone*

When 7,8-dimethoxy-2,5-dimethyl-2-(4,8,12,16,20,24,28,32,36-nonamethylheptatricontanyl)-6-chromanol is reacted with ferric chloride following the procedure described in Example 3, the corresponding $\gamma$-hydroxy side chain substituted benzoquinone is obtained.

The $\gamma$-hydroxy side chain substituted benzoquinone compounds of the present invention are useful as intermediates in the preparation of 5-phosphomethyl-6-chromanols. Thus, the $\gamma$-hydroxy compounds are reacted with an acyl chloride to produce the 5-chloromethyl-6-chromanyl acylates which on reaction with silver dibenzyl phosphate are converted to the 5-dibenzylphosphomethyl compounds. Selective reductive cleavage of the two benzyl moieties of the triphosphates yield the 5-phosphomethyl-6-chromanyl acylates which may be further selectively hydrolyzed to produce the corresponding 5-phosphomethyl-6-chromanols. Alternatively, the $\gamma$-hydroxy side chain compounds can be directly converted to the 5-phosphomethyl-6-chromanols by reaction with phosphoric acid. These reactions are described in detail in the copending application Serial No. 266,201, filed March 19, 1963, now United States Patent 3,160,638, which issued December 8, 1964.

Various changes and modifications of the invention can be made, and to the extent that such variations incorporate the spirit of this invention, they are intended to be included within the scope of the appended claims.

What is claimed is:
1. A compound of the formula

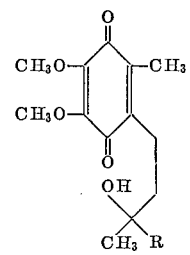

wherein R is a member selected from the group consisting of methyl and

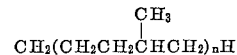

where $n$ is an integer from one to nine.

2. 2,3 - dimethoxy - 6 - (3 - hydroxy - 3 - methylbutyl)-5-methyl-1,4-benzoquinone.

3. 2,3 - dimethoxy - 6 - (3 - hydroxy - 3,7,11,15 - tetramethylhexadecyl)-5-methyl-1,4-benzoquinone.

References Cited by the Examiner
UNITED STATES PATENTS 3,127,434  3/1964  Andrews _____ 260—396
3,154,565  10/1964  Linn _____ 260—396

OTHER REFERENCES
Fieser: J. Biol. Chem., 137, 659–92 (1941).
Manecke: Chem. Ber., 94, 300–2 (1961).

LORRAINE A. WEINBERGER, *Primary Examiner.*

LEON ZITVER, *Examiner.*

D. P. CLARKE, A. THAXTON, *Assistant Examiners.*